US012562181B2

(12) United States Patent (10) Patent No.: US 12,562,181 B2
Takada et al. (45) Date of Patent: Feb. 24, 2026

(54) SIGNAL PROCESSING DEVICE, SIGNAL PROCESSING METHOD, AND NON-TRANSITORY COMPUTER READABLE RECORDING MEDIUM STORING SIGNAL PROCESSING PROGRAM

(71) Applicant: Panasonic Intellectual Property Corporation of America, Torrance, CA (US)

(72) Inventors: Moe Takada, Osaka (JP); Shinichi Yuzuriha, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 141 days.

(21) Appl. No.: 18/665,661

(22) Filed: May 16, 2024

(65) Prior Publication Data

US 2024/0304206 A1 Sep. 12, 2024

Related U.S. Application Data

(63) Continuation of application No. PCT/JP2022/037913, filed on Oct. 11, 2022.

(30) Foreign Application Priority Data

Nov. 25, 2021 (JP) ................................. 2021-191319

(51) Int. Cl.
*G10L 21/0272* (2013.01)
*G10L 15/06* (2013.01)
(Continued)

(52) U.S. Cl.
CPC ........ *G10L 21/0272* (2013.01); *G10L 15/063* (2013.01); *G10L 15/16* (2013.01); *G10L 15/20* (2013.01)

(58) Field of Classification Search
None
See application file for complete search history.

(56) References Cited

U.S. PATENT DOCUMENTS 9,741,360 B1 * 8/2017 Li ............................ G10L 25/51
10,614,827 B1 * 4/2020 Korjani ............... G10L 21/0364
(Continued)

FOREIGN PATENT DOCUMENTS

JP 2020-134657 A 8/2020

*Primary Examiner* — Peter Vincent Agustin
(74) *Attorney, Agent, or Firm* — Greenblum & Bernstein, P.L.C.

(57) ABSTRACT

A signal processing device includes: a mixed feature amount conversion part that converts a mixed acoustic signal including a plurality of acoustic signals into a mixed feature amount; a mask estimation part that estimates a plurality of masks based on the mixed feature amount; an acoustic signal conversion part that converts a plurality of separated feature amounts calculated using the plurality of masks into a plurality of separated acoustic signals; an environment acoustic signal extraction part that extracts, as an environment acoustic signal, the mixed acoustic signal in the environment sound section estimated based on the plurality of separated acoustic signals from the mixed acoustic signal; and an environment sound feature amount conversion part that converts the environment acoustic signal into an environment sound feature amount. The mask estimation part estimates the plurality of masks based on the mixed feature amount weighted using the environment sound feature amount.

10 Claims, 4 Drawing Sheets

(51) Int. Cl.
_G10L 15/16_ (2006.01)
_G10L 15/20_ (2006.01)

(56) References Cited

U.S. PATENT DOCUMENTS

| 2019/0267019 | A1* | 8/2019 | Ito | ........................ | G06F 18/2134 |
| 2020/0251097 | A1* | 8/2020 | Hu | .......................... | G10L 25/48 |
| 2021/0193163 | A1* | 6/2021 | Saito | ..................... | G10L 21/028 |
| 2022/0076690 | A1 | 3/2022 | Ochiai et al. | | |
| 2023/0335148 | A1* | 10/2023 | Lu | ........................ | G10L 21/0272 |
| 2024/0304206 | A1* | 9/2024 | Takada | ................ | G10L 21/0272 |

* cited by examiner

FIG.1

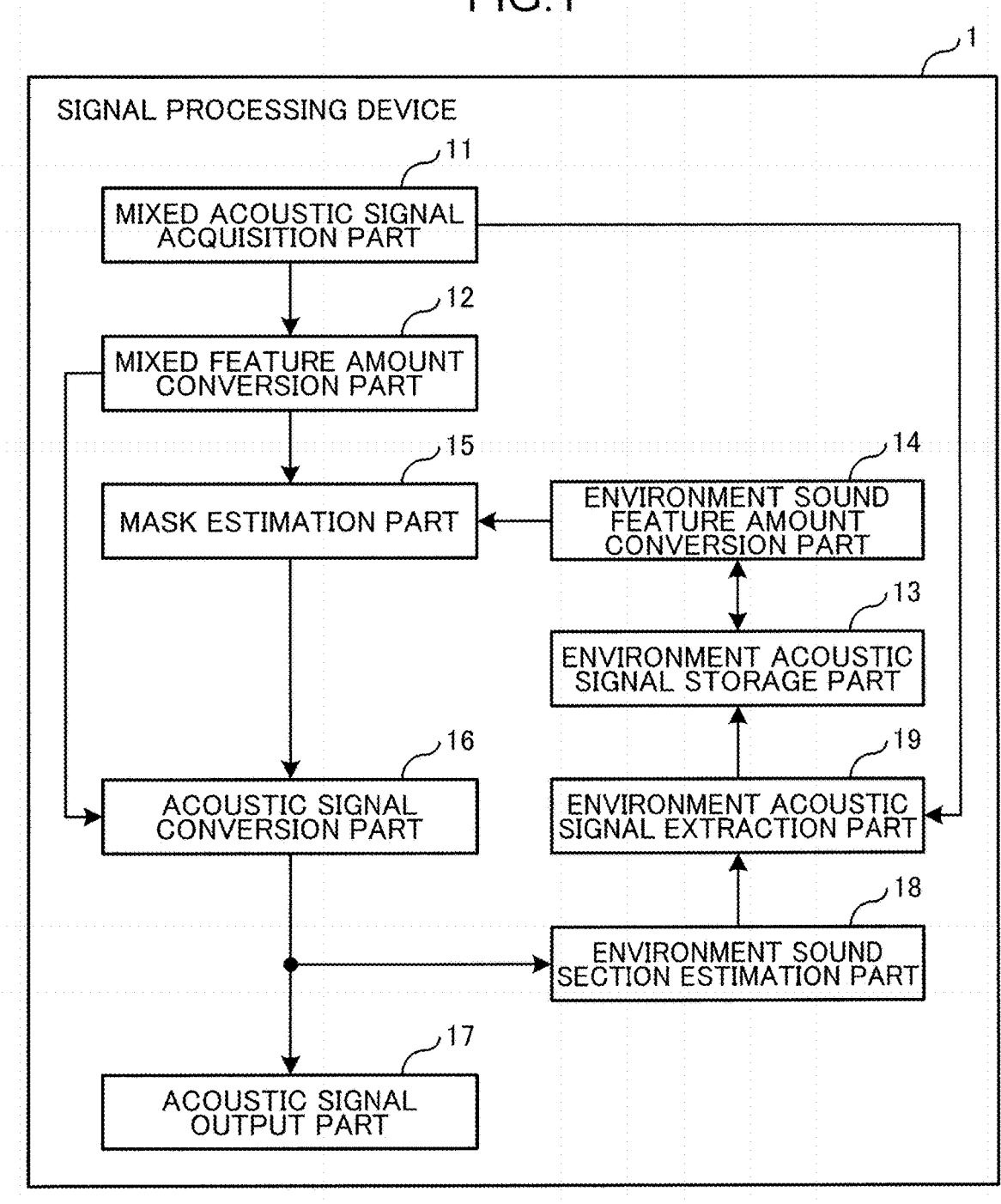

SIGNAL PROCESSING DEVICE

MIXED ACOUSTIC SIGNAL
ACQUISITION PART — 11

MIXED FEATURE AMOUNT
CONVERSION PART — 12

MASK ESTIMATION PART — 15

ENVIRONMENT SOUND
FEATURE AMOUNT
CONVERSION PART — 14

ENVIRONMENT ACOUSTIC
SIGNAL STORAGE PART — 13

ACOUSTIC SIGNAL
CONVERSION PART — 16

ENVIRONMENT ACOUSTIC
SIGNAL EXTRACTION PART — 19

ENVIRONMENT SOUND
SECTION ESTIMATION PART — 18

ACOUSTIC SIGNAL
OUTPUT PART — 17

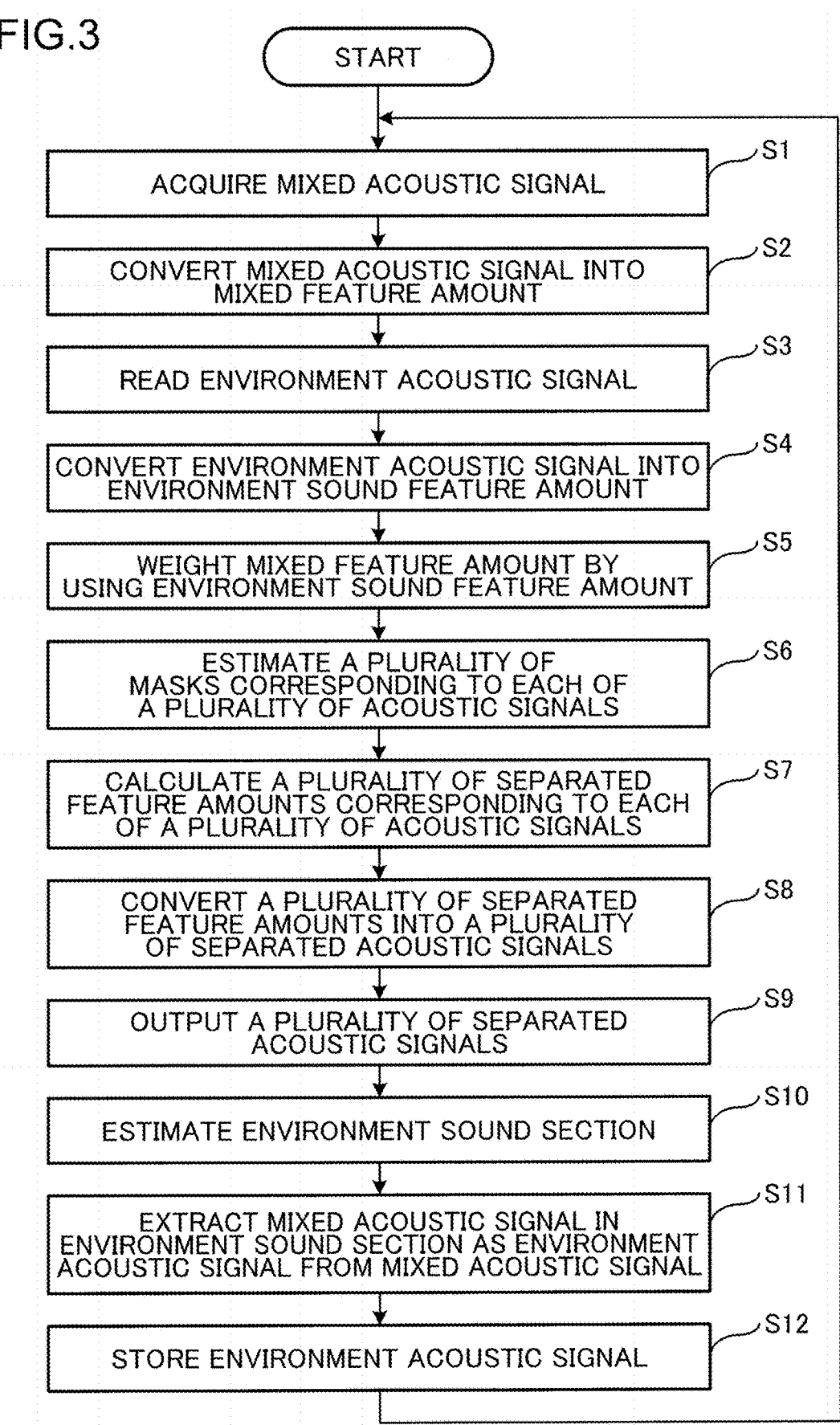

START

S1 — ACQUIRE MIXED ACOUSTIC SIGNAL

S2 — CONVERT MIXED ACOUSTIC SIGNAL INTO MIXED FEATURE AMOUNT

S3 — READ ENVIRONMENT ACOUSTIC SIGNAL

S4 — CONVERT ENVIRONMENT ACOUSTIC SIGNAL INTO ENVIRONMENT SOUND FEATURE AMOUNT

S5 — WEIGHT MIXED FEATURE AMOUNT BY USING ENVIRONMENT SOUND FEATURE AMOUNT

S6 — ESTIMATE A PLURALITY OF MASKS CORRESPONDING TO EACH OF A PLURALITY OF ACOUSTIC SIGNALS

S7 — CALCULATE A PLURALITY OF SEPARATED FEATURE AMOUNTS CORRESPONDING TO EACH OF A PLURALITY OF ACOUSTIC SIGNALS

S8 — CONVERT A PLURALITY OF SEPARATED FEATURE AMOUNTS INTO A PLURALITY OF SEPARATED ACOUSTIC SIGNALS

S9 — OUTPUT A PLURALITY OF SEPARATED ACOUSTIC SIGNALS

S10 — ESTIMATE ENVIRONMENT SOUND SECTION

S11 — EXTRACT MIXED ACOUSTIC SIGNAL IN ENVIRONMENT SOUND SECTION AS ENVIRONMENT ACOUSTIC SIGNAL FROM MIXED ACOUSTIC SIGNAL

S12 — STORE ENVIRONMENT ACOUSTIC SIGNAL

FIG.4

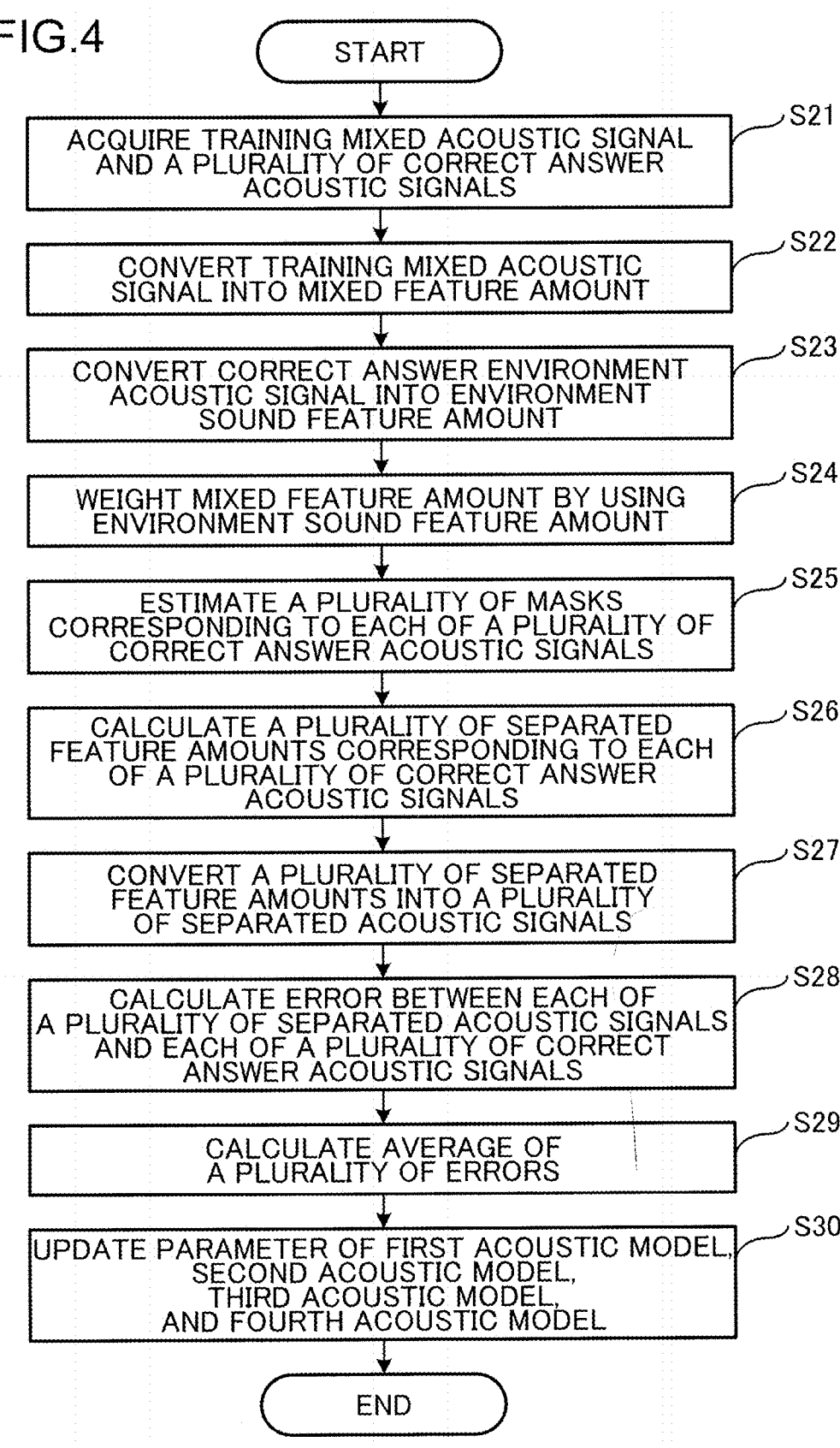

START

ACQUIRE TRAINING MIXED ACOUSTIC SIGNAL AND A PLURALITY OF CORRECT ANSWER ACOUSTIC SIGNALS — S21

CONVERT TRAINING MIXED ACOUSTIC SIGNAL INTO MIXED FEATURE AMOUNT — S22

CONVERT CORRECT ANSWER ENVIRONMENT ACOUSTIC SIGNAL INTO ENVIRONMENT SOUND FEATURE AMOUNT — S23

WEIGHT MIXED FEATURE AMOUNT BY USING ENVIRONMENT SOUND FEATURE AMOUNT — S24

ESTIMATE A PLURALITY OF MASKS CORRESPONDING TO EACH OF A PLURALITY OF CORRECT ANSWER ACOUSTIC SIGNALS — S25

CALCULATE A PLURALITY OF SEPARATED FEATURE AMOUNTS CORRESPONDING TO EACH OF A PLURALITY OF CORRECT ANSWER ACOUSTIC SIGNALS — S26

CONVERT A PLURALITY OF SEPARATED FEATURE AMOUNTS INTO A PLURALITY OF SEPARATED ACOUSTIC SIGNALS — S27

CALCULATE ERROR BETWEEN EACH OF A PLURALITY OF SEPARATED ACOUSTIC SIGNALS AND EACH OF A PLURALITY OF CORRECT ANSWER ACOUSTIC SIGNALS — S28

CALCULATE AVERAGE OF A PLURALITY OF ERRORS — S29

UPDATE PARAMETER OF FIRST ACOUSTIC MODEL, SECOND ACOUSTIC MODEL, THIRD ACOUSTIC MODEL, AND FOURTH ACOUSTIC MODEL — S30

END

SIGNAL PROCESSING DEVICE, SIGNAL PROCESSING METHOD, AND NON-TRANSITORY COMPUTER READABLE RECORDING MEDIUM STORING SIGNAL PROCESSING PROGRAM

FIELD OF INVENTION

The present disclosure relates to a technique for separating a plurality of acoustic signals from a mixed acoustic signal.

BACKGROUND ART

For example, Patent Literature 1 discloses a signal processing device including a conversion part that converts an input mixed acoustic signal into a plurality of first internal states, a weighting part that, in a case where auxiliary information regarding an acoustic signal of a target sound source is input, generates a second internal state that is a weighted sum of a plurality of the first internal states based on the auxiliary information, and in a case where auxiliary information is not input, generates the second internal state by selecting one of a plurality of the first internal states, and a mask estimation part that estimates a mask based on the second internal state.

However, in the above-described conventional technique, there is a possibility that complicated preparation processing for creating auxiliary information regarding an acoustic signal of a target sound source in advance is required, and there is also a possibility that performance of separating a plurality of acoustic signals from a mixed acoustic signal is lowered.

Accordingly, further improvement has been required.

Patent Literature 1: JP 2020-134657 A

SUMMARY OF THE INVENTION

The present disclosure has been made to solve the above problem, and an object of the present disclosure is to provide a technique in which complicated preparation processing for creating auxiliary information regarding an acoustic signal of a target sound source in advance is unnecessary, and lowering in performance of separating a plurality of acoustic signals from a mixed acoustic signal can be prevented.

A signal processing device according to the present disclosure includes a mixed acoustic signal acquisition part that acquires a mixed acoustic signal including a plurality of acoustic signals, a mixed feature amount conversion part that converts the mixed acoustic signal into a mixed feature amount indicating a feature of the mixed acoustic signal, a mask estimation part that estimates a plurality of masks corresponding to each of a plurality of the acoustic signals based on the mixed feature amount, an acoustic signal conversion part that calculates a plurality of separated feature amounts corresponding to each of a plurality of the acoustic signals from the mixed feature amount by using a plurality of the masks, and converts a plurality of the separated feature amounts that are calculated into a plurality of separated acoustic signals, an environment sound section estimation part that estimates an environment sound section including only an acoustic signal indicating an environment sound in all input sections of the mixed acoustic signal based on a plurality of the separated acoustic signals, an environment acoustic signal extraction part that extracts, as an environment acoustic signal, the mixed acoustic signal in the estimated environment sound section from the mixed acoustic signal, and an environment sound feature amount conversion part that converts the environment acoustic signal into an environment sound feature amount indicating a feature of the environment acoustic signal, and the mask estimation part weights the mixed feature amount by using the environment sound feature amount, and estimates a plurality of the masks based on the weighted mixed feature amount.

According to the present disclosure, complicated preparation processing for creating auxiliary information regarding an acoustic signal of a target sound source in advance is unnecessary, and lowering in performance of separating a plurality of acoustic signals from a mixed acoustic signal can be prevented.

BRIEF DESCRIPTION OF THE DRAWINGS

FIG. 1 is a block diagram illustrating a configuration of a signal processing device according to an embodiment of the present disclosure.

FIG. 2 is a block diagram illustrating a configuration of a learning device in the embodiment of the present disclosure.

FIG. 3 is a flowchart for describing sound source separation processing of the signal processing device in the present embodiment.

FIG. 4 is a flowchart for describing learning processing of the learning device in the present embodiment.

DETAILED DESCRIPTION (Knowledge Underlying Present Disclosure)

In the conventional technique described above, in a case where sound source separation is performed using auxiliary information of a target sound source, it is necessary to collect voice of the target sound source in advance and generate the auxiliary information from the collected voice of the target sound source, and there is a possibility that complicated preparation processing for creating auxiliary information regarding an acoustic signal of a target sound source in advance is required.

Further, in a case where blind sound source separation is performed in the above-described conventional technique, if noise (environment sound) that is not used for learning of a neural network model is included in a mixed acoustic signal, there is a possibility that performance of separating a plurality of acoustic signals from the mixed acoustic signal is lowered.

In order to solve the above problem, a technique below is disclosed.

(1) A signal processing device according to an aspect of the present disclosure includes a mixed acoustic signal acquisition part that acquires a mixed acoustic signal including a plurality of acoustic signals, a mixed feature amount conversion part that converts the mixed acoustic signal into a mixed feature amount indicating a feature of the mixed acoustic signal, a mask estimation part that estimates a plurality of masks corresponding to each of a plurality of the acoustic signals based on the mixed feature amount, an acoustic signal conversion part that calculates a plurality of separated feature amounts corresponding to each of a plurality of the acoustic signals from the mixed feature amount by using a plurality of the masks, and converts a plurality of the separated feature amounts that are calculated into a plurality of separated acoustic signals, an environment sound section estimation part that estimates an environment sound section including only an acoustic signal indicating an environment sound in all input sections of the mixed acoustic signal based on a plurality of the separated acoustic signals, an environment acoustic signal extraction part that extracts, as an environment acoustic signal, the mixed acoustic signal in the estimated environment sound section from the mixed acoustic signal, and an environment sound feature amount conversion part that converts the environment acoustic signal into an environment sound feature amount indicating a feature of the environment acoustic signal, and the mask estimation part weights the mixed feature amount by using the environment sound feature amount, and estimates a plurality of the masks based on the weighted mixed feature amount.

According to this configuration, from a mixed acoustic signal, a mixed acoustic signal in an environment sound section including only an acoustic signal indicating an environment sound is extracted as an environment acoustic signal, a mixed feature amount is weighted using an environment sound feature amount indicating a feature of the environment acoustic signal, and a plurality of masks are estimated based on the weighted mixed feature amount. Therefore, since a plurality of masks are estimated using an environment acoustic signal extracted from a mixed acoustic signal in real time and the mixed acoustic signal is separated into a plurality of separated acoustic signals using a plurality of the estimated masks, it is not necessary to perform complicated preparation processing for creating auxiliary information regarding an acoustic signal of a target sound source in advance as in the conventional technique, and it is possible to prevent lowering in performance of separating a plurality of acoustic signals from a mixed acoustic signal.

(2) In the signal processing device according to (1) described above, the mixed feature amount conversion part may include a first acoustic model that outputs the mixed feature amount when the mixed acoustic signal is input, the mask estimation part may include a second acoustic model that outputs a plurality of the masks when the mixed feature amount is input, the acoustic signal conversion part may include a third acoustic model that outputs a plurality of the separated acoustic signals when a plurality of the separated feature amounts that are calculated are input, and the environment sound feature amount conversion part may include a fourth acoustic model that outputs the environment sound feature amount when the environment acoustic signal is input.

According to this configuration, a mixed acoustic signal is input to the first acoustic model, and a mixed feature amount is output from the first acoustic model. Further, a mixed feature amount is input to the second acoustic model, and a plurality of masks are output from the second acoustic model. Further, a plurality of calculated separated feature amounts are input to the third acoustic model, and a plurality of separated acoustic signals are output from the third acoustic model. Further, an environment acoustic signal is input to the fourth acoustic model, and an environment sound feature amount is output from the fourth acoustic model.

Therefore, a mixed feature amount can be easily estimated by the first acoustic model, a plurality of masks can be easily estimated by the second acoustic model, a plurality of separated acoustic signals can be easily estimated by the third acoustic model, and an environment sound feature amount can be easily estimated by the fourth acoustic model.

(3) The signal processing device according to (2) described above further includes a training acoustic signal acquisition part that acquires a training mixed acoustic signal and a plurality of correct answer acoustic signals corresponding to a correct answer of a plurality of acoustic signals included in the training mixed acoustic signal, and a parameter update part that updates each parameter of the first acoustic model, the second acoustic model, the third acoustic model, and the fourth acoustic model. The mixed feature amount conversion part inputs the training mixed acoustic signal to the first acoustic model and acquires the mixed feature amount output from the first acoustic model, the environment sound feature amount conversion part inputs a correct answer environment acoustic signal indicating an environment sound corresponding to a correct answer among a plurality of the correct answer acoustic signals to the fourth acoustic model and acquires the environment sound feature amount output from the fourth acoustic model, the mask estimation part weights the mixed feature amount output from the first acoustic model by using the environment sound feature amount output from the fourth acoustic model, inputs the weighted mixed feature amount to the second acoustic model, and acquires a plurality of the masks output from the second acoustic model, the acoustic signal conversion part calculates a plurality of separated feature amounts corresponding to each of a plurality of the correct answer acoustic signals from the mixed feature amount by using a plurality of the masks output from the second acoustic model, inputs a plurality of the separated feature amounts that are calculated to the third acoustic model, and acquires a plurality of the separated acoustic signals output from the third acoustic model, and the parameter update part calculates an error between each of a plurality of the acoustic signals output from the third acoustic model and each of a plurality of the correct answer acoustic signals, and updates each parameter of the first acoustic model, the second acoustic model, the third acoustic model, and the fourth acoustic model based on a plurality of calculated errors.

According to this configuration, a training mixed acoustic signal and a plurality of correct answer acoustic signals corresponding to correct answers of a plurality of acoustic signals included in the training mixed acoustic signal are acquired. A training mixed acoustic signal is input to the first acoustic model, and a mixed feature amount is output from the first acoustic model. A correct answer environment acoustic signal indicating an environment sound corresponding to a correct answer among a plurality of correct answer acoustic signals is input to the fourth acoustic model, and an environment sound feature amount is output from the fourth acoustic model. The mixed feature amount output from the first acoustic model is weighted using the environment sound feature amount output from the fourth acoustic model. The weighted mixed feature amount is input to the second acoustic model, and a plurality of masks are output from the second acoustic model. A plurality of separated feature amounts corresponding to each of a plurality of correct answer acoustic signals are calculated from the mixed feature amount using a plurality of the masks output from the second acoustic model. A plurality of the calculated separated feature amounts are input to the third acoustic model, and a plurality of separated acoustic signals are output from the third acoustic model. An error between each of a plurality of the acoustic signals output from the third acoustic model and each of a plurality of correct answer acoustic signals is calculated. Each parameter of the first acoustic model, the second acoustic model, the third acoustic model, and the fourth acoustic model is updated based on a plurality of the calculated errors.

Therefore, the first acoustic model, the second acoustic model, the third acoustic model, and the fourth acoustic model can be trained using a training mixed acoustic signal and a plurality of correct answer acoustic signals corresponding to correct answers of a plurality of acoustic signals included in the training mixed acoustic signal, and estimation accuracy of the first acoustic model, the second acoustic model, the third acoustic model, and the fourth acoustic model can be improved.

(4) In the signal processing device according to any one of (1) to (3) described above, a plurality of the acoustic signals may include an acoustic signal indicating the environment sound and an acoustic signal indicating sound other than the environment sound.

According to this configuration, an acoustic signal indicating an environment sound and an acoustic signal indicating sound other than an environment sound can be separated from a mixed acoustic signal.

(5) In the signal processing device according to (4) described above, the sound other than the environment sound may be voice uttered by a person.

According to this configuration, an acoustic signal indicating an environment sound and an acoustic signal indicating voice uttered by a person can be separated from a mixed acoustic signal.

(6) In the signal processing device according to (4) described above, the sound other than the environment sound may be a sound emitted by a specific object.

According to this configuration, an acoustic signal indicating an environment sound and an acoustic signal indicating a sound emitted by a specific object can be separated from a mixed acoustic signal.

(7) In the signal processing device according to any one of (1) to (6) described above, the environment acoustic signal extraction part may store the extracted environment acoustic signal in a memory, and the environment sound feature amount conversion part may read the environment acoustic signal from the memory and converts the read environment acoustic signal into an environment sound feature amount.

According to this configuration, every time a mixed acoustic signal is acquired, an extracted environment acoustic signal is stored in the memory, and an environment sound feature amount is generated using the environment acoustic signal stored in the memory. Therefore, every time a mixed acoustic signal is acquired, a plurality of masks can be estimated in real time using an environment sound feature amount, and a plurality of separated acoustic signals can be accurately separated from the mixed acoustic signal using a plurality of the masks.

(8) The signal processing device according to any one of (1) to (7) may further include an acoustic signal output part that outputs a plurality of the separated acoustic signals converted by the acoustic signal conversion part.

According to this configuration, since a plurality of converted separated acoustic signals are output, signal processing such as voice recognition processing can be performed using a plurality of the output separated acoustic signals.

Further, the present disclosure can be realized not only as a signal processing device having the characteristic configuration as described above but also as a signal processing method for executing characteristic processing corresponding to the characteristic configuration included in the signal processing device. Further, the present disclosure can also be realized as a computer program that causes a computer to execute the characteristic processing included in the signal processing method. Therefore, also in another aspect described below, the same effect as that of the above-described signal processing device can be obtained.

(9) A signal processing method according to another aspect of the present disclosure includes, by a computer, acquiring a mixed acoustic signal including a plurality of acoustic signals, converting the mixed acoustic signal into a mixed feature amount indicating a feature of the mixed acoustic signal, estimating a plurality of masks corresponding to each of a plurality of the acoustic signals based on the mixed feature amount, calculating a plurality of separated feature amounts corresponding to each of a plurality of the acoustic signals from the mixed feature amount by using a plurality of the masks, and converting a plurality of the separated feature amounts that are calculated into a plurality of separated acoustic signals, estimating an environment sound section including only an acoustic signal indicating an environment sound in all input sections of the mixed acoustic signal based on a plurality of the separated acoustic signals, extracting, as an environment acoustic signal, the mixed acoustic signal in the estimated environment sound section from the mixed acoustic signal, and converting the environment acoustic signal into an environment sound feature amount indicating a feature of the environment acoustic signal, and, in estimation of the plurality of masks, the mixed feature amount is weighted using the environment sound feature amount, and a plurality of the masks are estimated based on the weighted mixed feature amount.

(10) A signal processing program according to another aspect of the present disclosure causes a computer to function as a mixed acoustic signal acquisition part that acquires a mixed acoustic signal including a plurality of acoustic signals, a mixed feature amount conversion part that converts the mixed acoustic signal into a mixed feature amount indicating a feature of the mixed acoustic signal, a mask estimation part that estimates a plurality of masks corresponding to each of a plurality of the acoustic signals based on the mixed feature amount, an acoustic signal conversion part that calculates a plurality of separated feature amounts corresponding to each of a plurality of the acoustic signals from the mixed feature amount by using a plurality of the masks, and converts a plurality of the separated feature amounts that are calculated into a plurality of separated acoustic signals, an environment sound section estimation part that estimates an environment sound section including only an acoustic signal indicating an environment sound in all input sections of the mixed acoustic signal based on a plurality of the separated acoustic signals, an environment acoustic signal extraction part that extracts, as an environment acoustic signal, the mixed acoustic signal in the estimated environment sound section from the mixed acoustic signal, and an environment sound feature amount conversion part that converts the environment acoustic signal into an environment sound feature amount indicating a feature of the environment acoustic signal, and the mask estimation part weights the mixed feature amount by using the environment sound feature amount, and estimates a plurality of the masks based on the weighted mixed feature amount.

(11) A non-transitory computer readable recording medium storing a signal processing program according to another aspect of the present disclosure causes a computer to function as a mixed acoustic signal acquisition part that acquires a mixed acoustic signal including a plurality of acoustic signals, a mixed feature amount conversion part that converts the mixed acoustic signal into a mixed feature amount indicating a feature of the mixed acoustic signal, a mask estimation part that estimates a plurality of masks corresponding to each of a plurality of the acoustic signals based on the mixed feature amount, an acoustic signal conversion part that calculates a plurality of separated feature amounts corresponding to each of a plurality of the acoustic signals from the mixed feature amount by using a plurality of the masks, and converts a plurality of the separated feature amounts that are calculated into a plurality of separated acoustic signals, an environment sound section estimation part that estimates an environment sound section including only an acoustic signal indicating an environment sound in all input sections of the mixed acoustic signal based on a plurality of the separated acoustic signals, an environment acoustic signal extraction part that extracts, as an environment acoustic signal, the mixed acoustic signal in the estimated environment sound section from the mixed acoustic signal, and an environment sound feature amount conversion part that converts the environment acoustic signal into an environment sound feature amount indicating a feature of the environment acoustic signal, and the mask estimation part weights the mixed feature amount by using the environment sound feature amount, and estimates a plurality of the masks based on the weighted mixed feature amount.

An embodiment of the present disclosure will be described below with reference to the accompanying drawings. Note that the embodiment below is an example of embodiment of the present disclosure, and is not intended to limit the technical scope of the present disclosure.

(Embodiment)

FIG. 1 is a block diagram illustrating a configuration of a signal processing device 1 according to the embodiment of the present disclosure.

The signal processing device 1 separates a plurality of acoustic signals from a mixed acoustic signal. The mixed acoustic signal includes a plurality of acoustic signals. A plurality of acoustic signals include, for example, an acoustic signal indicating an environment sound and an acoustic signal indicating sound other than an environment sound. Sound other than an environment sound is, for example, voice uttered by a person.

The signal processing device 1 illustrated in FIG. 1 includes a mixed acoustic signal acquisition part 11, a mixed feature amount conversion part 12, an environment acoustic signal storage part 13, an environment sound feature amount conversion part 14, a mask estimation part 15, an acoustic signal conversion part 16, an acoustic signal output part 17, an environment sound section estimation part 18, and an environment acoustic signal extraction part 19.

The mixed acoustic signal acquisition part 11, the mixed feature amount conversion part 12, the environment sound feature amount conversion part 14, the mask estimation part 15, the acoustic signal conversion part 16, the acoustic signal output part 17, the environment sound section estimation part 18, and the environment acoustic signal extraction part 19 are realized by a processor. The processor includes, for example, a central processing unit (CPU) or the like.

The environment acoustic signal storage part 13 is realized by a memory. The memory includes, for example, a read only memory (ROM), an electrically erasable programmable read only memory (EEPROM), or the like.

Note that the signal processing device 1 may be, for example, a computer, a smartphone, a tablet computer, or a server. Further, the signal processing device 1 may be incorporated in another device such as an automotive navigation device or a home appliance.

The mixed acoustic signal acquisition part 11 acquires a mixed acoustic signal including a plurality of acoustic signals. For example, the mixed acoustic signal includes a first acoustic signal indicating an environment sound around a person and a second acoustic signal indicating human voice. The mixed acoustic signal acquisition part 11 may be connected to a microphone (not illustrated). The microphone collects a sound from a plurality of sound sources, converts the sound into an acoustic signal, and outputs the converted acoustic signal to the signal processing device 1 as a mixed acoustic signal. For example, the microphone collects voice uttered by a person and an environment sound around a person. The mixed acoustic signal acquisition part 11 acquires a mixed acoustic signal from the microphone.

Further, the mixed acoustic signal acquisition part 11 acquires a mixed acoustic signal of a predetermined period every predetermined period. For example, the mixed acoustic signal acquisition part 11 may acquire a mixed acoustic signal of ten seconds every ten seconds.

Note that, in the present embodiment, the mixed acoustic signal acquisition part 11 acquires a mixed acoustic signal collected by a microphone directly from the microphone, but the present disclosure is not particularly limited to this. For example, a mixed acoustic signal collected by a microphone or the like may be recorded in a computer-readable recording medium. The mixed acoustic signal acquisition part 11 may acquire a mixed acoustic signal from a computer-readable recording medium. The computer-readable recording medium is, for example, a semiconductor memory, a hard disk drive, an optical disk, or a universal serial bus (USB) memory. Further, the mixed acoustic signal acquisition part 11 may acquire a mixed acoustic signal from another device via a network such as the Internet.

The mixed feature amount conversion part 12 converts a mixed acoustic signal acquired by the mixed acoustic signal acquisition part 11 into a mixed feature amount indicating a feature of the mixed acoustic signal. The mixed feature amount is a feature amount in which a mixed acoustic signal is expressed by a vector or a matrix, and is, for example, an embedding vector. The mixed feature amount conversion part 12 includes a first acoustic model that outputs a mixed feature amount when a mixed acoustic signal is input. The first acoustic model is, for example, a convolutional neural network, a recurrent neural network, a long short-term memory network, or a deep neural network. The first acoustic model converts an input mixed acoustic signal into a mixed feature amount and outputs the mixed feature amount. The first acoustic model is trained by machine learning by a learning device 2 to be described later.

The mixed feature amount conversion part 12 inputs a mixed acoustic signal to the first acoustic model and acquires a mixed feature amount output from the first acoustic model. The mixed feature amount conversion part 12 outputs a mixed feature amount converted from a mixed acoustic signal to the mask estimation part 15 and the acoustic signal conversion part 16.

The environment acoustic signal storage part 13 stores, as an environment acoustic signal, a mixed acoustic signal in an environment sound section including only an acoustic signal indicating an environment sound in all input sections of a mixed acoustic signal. The environment acoustic signal storage part 13 temporarily stores an environment acoustic signal. An environment acoustic signal stored in the environment acoustic signal storage part 13 is newly updated every predetermined period.

The environment sound feature amount conversion part 14 converts an environment acoustic signal into an environment sound feature amount indicating a feature of an environment acoustic signal. The environment sound feature amount conversion part 14 reads an environment acoustic signal from the environment acoustic signal storage part 13 and converts the read environment acoustic signal into an environment sound feature amount. The environment sound feature amount is a feature amount in which an environment acoustic signal is expressed by a vector or a matrix, and is, for example, an embedded vector. The environment sound feature amount conversion part 14 includes a fourth acoustic model that outputs an environment sound feature amount when an environment acoustic signal is input. The fourth acoustic model is, for example, a convolutional neural network, a recurrent neural network, a long short-term memory network, or a deep neural network. The fourth acoustic model is trained by machine learning by the learning device 2 to be described later.

The environment sound feature amount conversion part 14 inputs an environment acoustic signal to the fourth acoustic model and acquires an environment sound feature amount output from the fourth acoustic model. An environment sound feature amount corresponds to auxiliary information. The environment sound feature amount conversion part 14 outputs an environment sound feature amount converted from an environment acoustic signal to the mask estimation part 15.

The mask estimation part 15 estimates a plurality of masks corresponding to each of a plurality of acoustic signals based on a mixed feature amount converted by the mixed feature amount conversion part 12. The mask estimation part 15 includes a second acoustic model that outputs a plurality of masks when a mixed feature amount is input. The second acoustic model is, for example, a convolutional neural network, a recurrent neural network, a long short-term memory network, or a deep neural network. The second acoustic model is trained by machine learning by the learning device 2 to be described later. Further, the mask estimation part 15 weights a mixed feature amount by using an environment sound feature amount converted by the environment sound feature amount conversion part 14, and estimates a plurality of masks based on the weighted mixed feature amount. A plurality of masks are, for example, a time frequency mask.

The mask estimation part 15 inputs a mixed feature amount weighted using an environment sound feature amount to the second acoustic model, and acquires a plurality of masks corresponding to each of a plurality of acoustic signals output from the second acoustic model. The mask estimation part 15 outputs a plurality of masks estimated from a mixed feature amount to the acoustic signal conversion part 16.

By weighting of a mixed feature amount with an environment sound feature amount, it is possible to accurately estimate a mask for extracting an acoustic signal indicating an environment sound and a mask for extracting an acoustic signal indicating sound other than an environment sound.

For example, in a case where a mixed acoustic signal includes a first acoustic signal indicating an environment sound around a person and a second acoustic signal indicating a human voice, the mask estimation part 15 estimates a first mask for extracting the first acoustic signal indicating the environment sound and estimates a second mask for extracting the second acoustic signal indicating the human voice based on a mixed feature amount converted by the mixed feature amount conversion part 12.

The acoustic signal conversion part 16 calculates a plurality of separated feature amounts corresponding to each of a plurality of acoustic signals from a mixed feature amount converted by the mixed feature amount conversion part 12 by using a plurality of masks estimated by the mask estimation part 15. The separated feature amount is a feature amount in which an acoustic signal included in a mixed acoustic signal is expressed by a vector or a matrix, and is, for example, an embedded vector.

The acoustic signal conversion part 16 masks a mixed feature amount by using a plurality of masks estimated by the mask estimation part 15 and calculates a plurality of separated feature amounts corresponding to each of a plurality of acoustic signals.

Further, the acoustic signal conversion part 16 converts a plurality of calculated separated feature amounts into a plurality of separated acoustic signals. The acoustic signal conversion part 16 includes a third acoustic model that outputs a plurality of separated acoustic signals when a plurality of calculated separated feature amounts are input. The third acoustic model is, for example, a convolutional neural network, a recurrent neural network, a long short-term memory network, or a deep neural network. The third acoustic model is trained by machine learning by the learning device 2 to be described later.

The acoustic signal conversion part 16 inputs a plurality of calculated separated feature amounts to the third acoustic model and acquires a plurality of separated acoustic signals output from the third acoustic model. The acoustic signal conversion part 16 outputs a plurality of separated acoustic signals converted from a plurality of separated feature amounts to the acoustic signal output part 17 and the environment sound section estimation part 18.

For example, the acoustic signal conversion part 16 calculates a first separated feature amount corresponding to the first acoustic signal from a mixed feature amount by using the first mask estimated by the mask estimation part 15, and calculates a second separated feature amount corresponding to the second acoustic signal from the mixed feature amount by using the second mask estimated by the mask estimation part 15. The acoustic signal conversion part 16 calculates the first separated feature amount corresponding to the first acoustic signal by multiplying a mixed feature amount by the first mask in each time frequency component, and calculates the second separated feature amount corresponding to the second acoustic signal by multiplying the mixed feature amount by the second mask in each time frequency component. Further, the acoustic signal conversion part 16 converts the calculated first separated feature amount into a first separated acoustic signal, and converts the calculated second separated feature amount into a second separated acoustic signal.

The acoustic signal output part 17 outputs a plurality of separated acoustic signals converted by the acoustic signal conversion part 16. The acoustic signal output part 17 outputs a plurality of separated acoustic signals separated from a mixed acoustic signal. The acoustic signal output part 17 may output all of a plurality of separated acoustic signals or may output a part of a plurality of separated acoustic signals.

For example, the acoustic signal output part 17 outputs the first separated acoustic signal indicating an environment sound and the second separated acoustic signal indicating human voice converted by the acoustic signal conversion part 16. By separating an environment sound from human voice, it is possible to remove an environment sound such as factory noise, noise inside a vehicle, or noise outside a vehicle from an input mixed acoustic signal and to extract only human voice. Then, the second separated acoustic signal indicating human voice is used for voice recognition, for example. Further, the first separated acoustic signal indicating an environment sound is used, for example, to detect an event that occurs around a person. The acoustic signal output part 17 may output both the first separated acoustic signal and the second separated acoustic signal, or may output one of the first separated acoustic signal and the second separated acoustic signal.

The environment sound section estimation part 18 estimates an environment sound section including only an acoustic signal indicating an environment sound in all input sections of a mixed acoustic signal based on a plurality of separated acoustic signals converted by the acoustic signal conversion part 16. For example, the environment sound section estimation part 18 estimates an environment sound section including only an acoustic signal indicating an environment sound in all input sections of a mixed acoustic signal by subtracting a section of the second separated acoustic signal indicating human voice from a section of the first separated acoustic signal indicating an environment sound.

Further, the configuration may be such that the environment sound section estimation part 18 identifies a voice section including human voice and a non-voice section including a sound other than human voice from all input sections of each of a plurality of acoustic signals by voice activity detection (VAD) processing, and estimates a section including only the non-voice section not overlapping the voice section as an environment sound section. For example, by the VAD processing, the environment sound section estimation part 18 identifies a voice section and a non-voice section from all input sections of the first separated acoustic signal indicating an environment sound, and identifies a voice section and a non-voice section from all input sections of the second separated acoustic signal indicating human voice. Then, the environment sound section estimation part 18 may estimate, as an environment sound section, a section of only the non-voice section that does not overlap the voice section among all input sections of a mixed acoustic signal.

The environment acoustic signal extraction part 19 extracts a mixed acoustic signal in an environment sound section estimated by the environment sound section estimation part 18 as an environment acoustic signal from a mixed acoustic signal. The environment acoustic signal extraction part 19 stores an extracted environment acoustic signal in the environment acoustic signal storage part 13. The environment acoustic signal extraction part 19 stores an environment acoustic signal in the environment acoustic signal storage part 13 every predetermined period, and updates an environment acoustic signal in the environment acoustic signal storage part 13. The predetermined period is an interval at which a mixed acoustic signal is acquired.

As described above, an environment acoustic signal is stored in the environment acoustic signal storage part 13 every predetermined period, the environment acoustic signal stored in the environment acoustic signal storage part 13 is converted into an environment sound feature amount indicating a feature of an environment acoustic signal, and the converted environment sound feature amount is used for estimation of a plurality of masks. Therefore, it is possible to separate a plurality of acoustic signals from a mixed acoustic signal by using an environment sound that changes in real time.

Subsequently, a configuration of the learning device 2 according to the embodiment of the present disclosure will be described.

Figure 2:
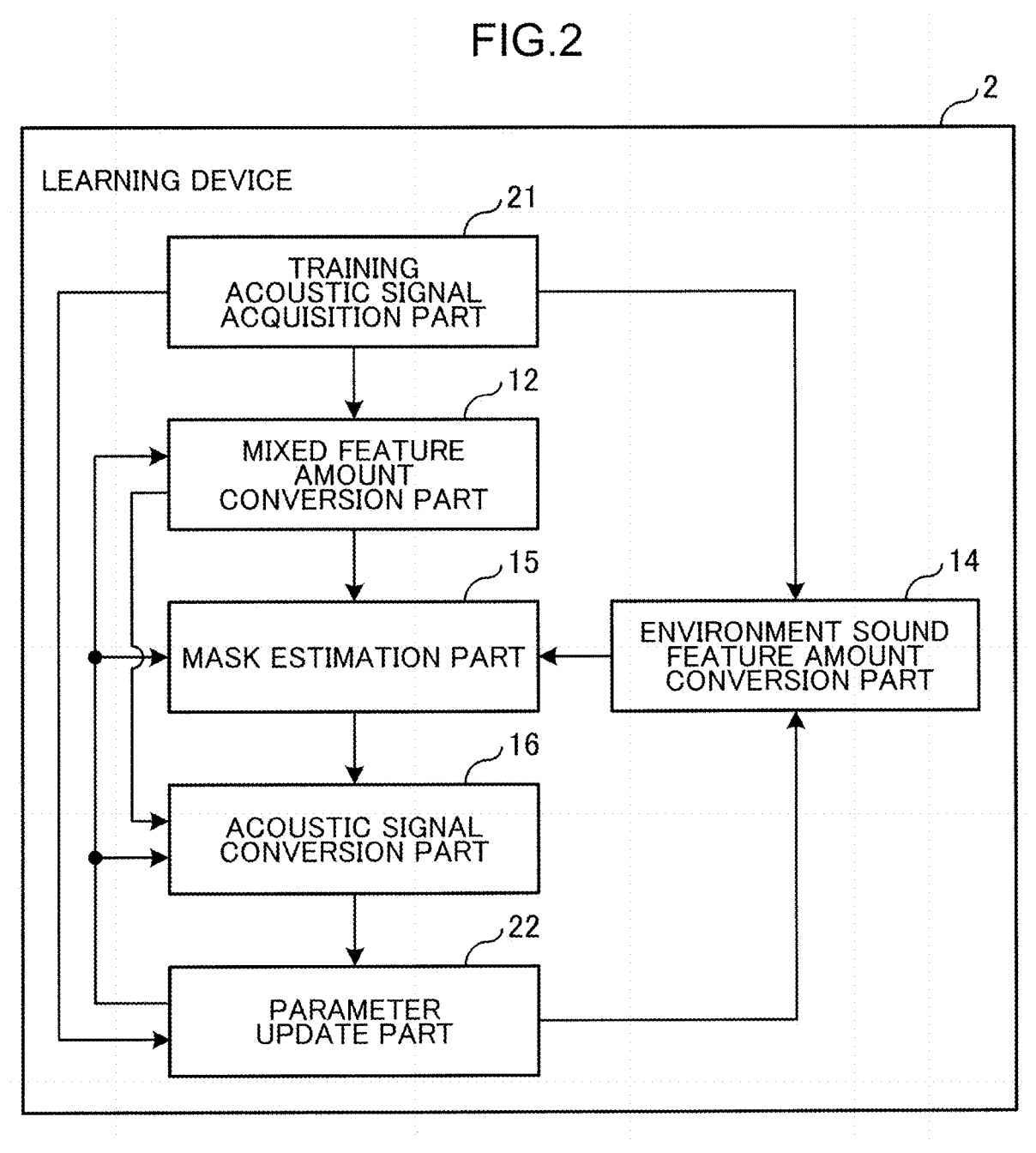

FIG. 2 is a block diagram illustrating a configuration of the learning device 2 in the embodiment of the present disclosure.

The learning device 2 learns a parameter of each acoustic model (for example, a neural network) of the mixed feature amount conversion part 12, the environment sound feature amount conversion part 14, the mask estimation part 15, and the acoustic signal conversion part 16.

The learning device 2 illustrated in FIG. 2 includes a training acoustic signal acquisition part 21, the mixed feature amount conversion part 12, the environment sound feature amount conversion part 14, the mask estimation part 15, the acoustic signal conversion part 16, and a parameter update part 22. Note that, in the learning device 2, the same configuration as that of the signal processing device 1 is denoted by the same reference sign, and omitted from description.

The training acoustic signal acquisition part 21, the mixed feature amount conversion part 12, the environment sound feature amount conversion part 14, the mask estimation part 15, the acoustic signal conversion part 16, and the parameter update part 22 are realized by a processor. The processor includes, for example, a CPU and the like.

Note that the learning device 2 may be, for example, a computer or a server. Further, in the present embodiment, the signal processing device 1 and the learning device 2 are different devices, but the signal processing device 1 may include the training acoustic signal acquisition part 21 and the parameter update part 22 of the learning device 2. That is, the signal processing device 1 may include a function of the learning device 2.

The training acoustic signal acquisition part 21 acquires a training mixed acoustic signal and a plurality of correct answer acoustic signals corresponding to correct answers of a plurality of acoustic signals included in a training mixed acoustic signal. The training acoustic signal acquisition part 21 outputs a plurality of correct answer acoustic signals to the parameter update part 22, outputs a training mixed acoustic signal to the mixed feature amount conversion part 12, and outputs a correct answer environment acoustic signal indicating an environment sound corresponding to a correct answer among a plurality of correct answer acoustic signals to the environment sound feature amount conversion part 14.

The training acoustic signal acquisition part 21 may be connected to a microphone (not illustrated). The microphone individually collects sounds from a plurality of sound sources, converts each of the sounds into an acoustic signal, and outputs each of the converted acoustic signals to the signal processing device 1 as a correct answer acoustic signal. For example, the microphone individually collects voice uttered by a person and a surrounding environment sound. Further, the microphone collects a sound obtained by mixing a plurality of sounds identical to a plurality of correct answer acoustic signals, converts the sound into an acoustic signal, and outputs the converted acoustic signal to the signal processing device 1 as a training mixed acoustic signal. The training acoustic signal acquisition part 21 acquires a training mixed acoustic signal and a plurality of correct answer acoustic signals from a microphone. Further, the training acoustic signal acquisition part 21 uses a training mixed acoustic signal and a plurality of correct answer acoustic signals as one piece of training data and acquires a plurality of pieces of training data.

Note that, in the present embodiment, the training acoustic signal acquisition part 21 acquires a training mixed acoustic signal and a plurality of correct answer acoustic signals collected by a microphone directly from the microphone, but the present disclosure is not particularly limited to this. For example, a training mixed acoustic signal and a plurality of correct answer acoustic signals collected by a microphone or the like may be recorded in a computer-readable recording medium. The training acoustic signal acquisition part 21 may acquire a training mixed acoustic signal and a plurality of correct answer acoustic signals from a computer-readable recording medium. Further, the training acoustic signal acquisition part 21 may acquire a training mixed acoustic signal and a plurality of correct answer acoustic signals from another device via a network such as the Internet.

The parameter update part 22 updates each parameter of the first acoustic model, the second acoustic model, the third acoustic model, and the fourth acoustic model.

The mixed feature amount conversion part 12 converts a training mixed acoustic signal acquired by the training acoustic signal acquisition part 21 into a mixed feature amount indicating a feature of the training mixed acoustic signal. The mixed feature amount conversion part 12 inputs a training mixed acoustic signal acquired by the training acoustic signal acquisition part 21 to the first acoustic model and acquires a mixed feature amount output from the first acoustic model.

The environment sound feature amount conversion part 14 converts a correct answer environment acoustic signal indicating an environment sound corresponding to a correct answer among a plurality of correct answer acoustic signals acquired by the training acoustic signal acquisition part 21 into an environment sound feature amount indicating a feature of the correct answer environment acoustic signal. The environment sound feature amount conversion part 14 inputs a correct answer environment acoustic signal indicating an environment sound corresponding to a correct answer among a plurality of correct answer acoustic signals acquired by the training acoustic signal acquisition part 21 to the fourth acoustic model, and acquires an environment sound feature amount output from the fourth acoustic model.

The mask estimation part 15 weights a mixed feature amount by using an environment sound feature amount converted by the environment sound feature amount conversion part 14, and estimates a plurality of masks corresponding to each of a plurality of correct answer acoustic signals based on the weighted mixed feature amount. The mask estimation part 15 weights a mixed feature amount output from the first acoustic model by using an environment sound feature amount output from the fourth acoustic model, inputs the weighted mixed feature amount to the second acoustic model, and acquires a plurality of masks output from the second acoustic model.

The acoustic signal conversion part 16 calculates a plurality of separated feature amounts corresponding to each of a plurality of correct answer acoustic signals from a mixed feature amount by using a plurality of masks output from the second acoustic model. The acoustic signal conversion part 16 masks a mixed feature amount by using a plurality of masks estimated by the mask estimation part 15 and calculates a plurality of separated feature amounts corresponding to each of a plurality of correct answer acoustic signals. Further, the acoustic signal conversion part 16 converts a plurality of calculated separated feature amounts into a plurality of separated acoustic signals. The acoustic signal conversion part 16 inputs a plurality of calculated separated feature amounts to the third acoustic model and acquires a plurality of separated acoustic signals output from the third acoustic model.

The parameter update part 22 calculates an error between each of a plurality of separated acoustic signals output from the third acoustic model and each of a plurality of correct answer acoustic signals acquired by the training acoustic signal acquisition part 21, and updates each parameter of the first acoustic model of the mixed feature amount conversion part 12, the second acoustic model of the mask estimation part 15, the third acoustic model of the acoustic signal conversion part 16, and the fourth acoustic model of the environment sound feature amount conversion part 14 based on a plurality of the calculated errors. The parameter update part 22 updates each parameter of the first acoustic model, the second acoustic model, the third acoustic model, and the fourth acoustic model by backpropagation. More specifically, the parameter update part 22 calculates an average of errors between each of a plurality of separated acoustic signals output from the third acoustic model and each of a plurality of correct answer acoustic signals, and updates each parameter of the first acoustic model, the second acoustic model, the third acoustic model, and the fourth acoustic model so that the calculated average of a plurality of errors is minimized.

As each part of the learning device 2 performs processing on a plurality of pieces of training data, a parameter of the first acoustic model, the second acoustic model, the third acoustic model, and the fourth acoustic model is repeatedly updated, and the first acoustic model, the second acoustic model, the third acoustic model, and the fourth acoustic model are learned.

The mixed feature amount conversion part 12 including the first acoustic model that is trained, the mask estimation part 15 including the second acoustic model that is trained, the acoustic signal conversion part 16 including the third acoustic model that is trained, and the environment sound feature amount conversion part 14 including the fourth acoustic model that is trained are mounted on the signal processing device 1.

Next, sound source separation processing of the signal processing device 1 according to the present embodiment will be described.

FIG. 3 is a flowchart for describing the sound source separation processing of the signal processing device 1 in the present embodiment.

First, in step S1, the mixed acoustic signal acquisition part 11 acquires a mixed acoustic signal including a plurality of acoustic signals. For example, the mixed acoustic signal includes a first acoustic signal indicating an environment sound around a person and a second acoustic signal indicating human voice. Note that the second acoustic signal may indicate not only voice of one person but also voice of a plurality of people.

Next, in step S2, the mixed feature amount conversion part 12 converts a mixed acoustic signal acquired by the mixed acoustic signal acquisition part 11 into a mixed feature amount indicating a feature of the mixed acoustic signal. At this time, the mixed feature amount conversion part 12 inputs the mixed acoustic signal to the first acoustic model that is trained and acquires a mixed feature amount output from the first acoustic model.

Next, in step S3, the environment sound feature amount conversion part 14 reads an environment acoustic signal indicating only an environment sound from the environment acoustic signal storage part 13.

Next, in step S4, the environment sound feature amount conversion part 14 converts an environment acoustic signal read from the environment acoustic signal storage part 13 into an environment sound feature amount indicating a feature of the environment acoustic signal. At this time, the environment sound feature amount conversion part 14 inputs the environment acoustic signal to the fourth acoustic model that is trained and acquires an environment sound feature amount output from the fourth acoustic model.

Next, in step S5, the mask estimation part 15 weights a mixed feature amount by using an environment sound feature amount converted by the environment sound feature amount conversion part 14.

Next, in step S6, the mask estimation part 15 estimates a plurality of masks corresponding to each of a plurality of acoustic signals based on a mixed feature amount weighted using an environment sound feature amount. At this time, the mask estimation part 15 inputs the mixed feature amount weighted using the environment sound feature amount to the second acoustic model that is trained, and acquires a plurality of masks corresponding to each of a plurality of acoustic signals output from the second acoustic model. For example, the mask estimation part 15 inputs the mixed feature amount weighted using the environment sound feature amount to the second acoustic model that is trained, and acquires the first mask corresponding to the first acoustic signal and the second mask corresponding to the second acoustic signal output from the second acoustic model.

Note that, in the sound source separation processing performed for the first time, an environment acoustic signal is not stored in the environment acoustic signal storage part 13, and the mask estimation part 15 cannot weight a mixed feature amount by using an environment sound feature amount. For this reason, in the sound source separation processing performed for the first time, the mask estimation part 15 may estimate a plurality of masks corresponding to each of a plurality of acoustic signals based on a mixed feature amount converted by the mixed feature amount conversion part 12 without performing weighting using an environment sound feature amount. Then, in the sound source separation processing performed for the second and subsequent times, the mask estimation part 15 may estimate a plurality of masks corresponding to each of a plurality of acoustic signals based on a mixed feature amount weighted using an environment sound feature amount.

Next, in step S7, the acoustic signal conversion part 16 calculates a plurality of separated feature amounts corresponding to each of a plurality of acoustic signals from a mixed feature amount converted by the mixed feature amount conversion part 12 by using a plurality of masks estimated by the mask estimation part 15. At this time, the acoustic signal conversion part 16 calculates a plurality of separated feature amounts corresponding to each of a plurality of acoustic signals by multiplying a mixed feature amount converted by the mixed feature amount conversion part 12 by each of a plurality of masks estimated by the mask estimation part 15 in each time frequency component. For example, the acoustic signal conversion part 16 calculates the first separated feature amount corresponding to the first acoustic signal by multiplying the mixed feature amount converted by the mixed feature amount conversion part 12 and the first mask estimated by the mask estimation part 15 in each time frequency component, and calculates the second separated feature amount corresponding to the second acoustic signal by multiplying the mixed feature amount converted by the mixed feature amount conversion part 12 and the second mask estimated by the mask estimation part 15 in each time frequency component.

Next, in step S8, the acoustic signal conversion part 16 converts a plurality of calculated separated feature amounts into a plurality of separated acoustic signals. At this time, the acoustic signal conversion part 16 inputs a plurality of calculated separated feature amounts to the third acoustic model that is trained and acquires a plurality of separated acoustic signals output from the third acoustic model. For example, the acoustic signal conversion part 16 inputs the calculated first separated feature amount to the third acoustic model that is trained and acquires the first separated acoustic signal output from the third acoustic model, and inputs the calculated second separated feature amount to the third acoustic model that is trained and acquires the second separated acoustic signal output from the third acoustic model.

Next, in step S9, the acoustic signal output part 17 outputs a plurality of separated acoustic signals converted by the acoustic signal conversion part 16. For example, the acoustic signal output part 17 outputs the first separated acoustic signal and the second separated acoustic signal converted by the acoustic signal conversion part 16.

Next, in step S10, the environment sound section estimation part 18 estimates an environment sound section including only an acoustic signal indicating an environment sound in all input sections of a mixed acoustic signal based on a plurality of separated acoustic signals converted by the acoustic signal conversion part 16. For example, the environment sound section estimation part 18 estimates an environment sound section including only an acoustic signal indicating an environment sound in all input sections of a mixed acoustic signal based on the first separated acoustic signal and the second separated acoustic signal converted by the acoustic signal conversion part 16.

Next, in step S11, the environment acoustic signal extraction part 19 extracts a mixed acoustic signal in the environment sound section estimated by the environment sound section estimation part 18 as an environment acoustic signal from the mixed acoustic signal acquired by the mixed acoustic signal acquisition part 11.

Next, in step S12, the environment acoustic signal extraction part 19 stores the extracted environment acoustic signal in the environment acoustic signal storage part 13. When the processing of step S12 ends, the processing returns to step S1.

As described above, from a mixed acoustic signal, a mixed acoustic signal in an environment sound section including only an acoustic signal indicating an environment sound is extracted as an environment acoustic signal, a mixed feature amount is weighted using an environment sound feature amount indicating a feature of the environment acoustic signal, and a plurality of masks are estimated based on the weighted mixed feature amount. Therefore, since a plurality of masks are estimated using an environment acoustic signal extracted from a mixed acoustic signal in real time and the mixed acoustic signal is separated into a plurality of separated acoustic signals using a plurality of the estimated masks, it is not necessary to perform complicated preparation processing for creating auxiliary information regarding an acoustic signal of a target sound source in advance as in the conventional technique, and it is possible to prevent lowering in performance of separating a plurality of acoustic signals from a mixed acoustic signal.

Further, by using an environment sound feature amount indicating a feature of an environment sound as auxiliary information while estimating a surrounding environment sound, it is possible to accurately perform sound source separation while adapting each acoustic model to a use environment in real time.

Subsequently, learning processing of the learning device 2 according to the present embodiment will be described.

FIG. 4 is a flowchart for describing learning processing of the learning device 2 in the present embodiment.

First, in step S21, the training acoustic signal acquisition part 21 acquires a training mixed acoustic signal and a plurality of correct answer acoustic signals. For example, a plurality of correct answer acoustic signals include a first correct answer acoustic signal indicating an environment sound around a person and a second correct answer acoustic signal indicating human voice.

Next, in step S22, the mixed feature amount conversion part 12 converts the training mixed acoustic signal acquired by the training acoustic signal acquisition part 21 into a mixed feature amount indicating a feature of the training mixed acoustic signal. At this time, the mixed feature amount conversion part 12 inputs the training mixed acoustic signal acquired by the training acoustic signal acquisition part 21 to the first acoustic model that is untrained and acquires a mixed feature amount output from the first acoustic model.

Next, in step S23, the environment sound feature amount conversion part 14 converts a correct answer environment acoustic signal indicating an environment sound corresponding to a correct answer among a plurality of correct answer acoustic signals acquired by the training acoustic signal acquisition part 21 into an environment sound feature amount indicating a feature of the correct answer environment acoustic signal. At this time, the environment sound feature amount conversion part 14 inputs a correct answer environment acoustic signal among a plurality of correct answer acoustic signals acquired by the training acoustic signal acquisition part 21 to the fourth acoustic model that is untrained, and acquires an environment sound feature amount output from the fourth acoustic model.

Next, in step S24, the mask estimation part 15 weights a mixed feature amount by using an environment sound feature amount converted by the environment sound feature amount conversion part 14.

Next, in step S25, the mask estimation part 15 estimates a plurality of masks corresponding to each of a plurality of correct answer acoustic signals based on the mixed feature amount weighted using an environment sound feature amount. At this time, the mask estimation part 15 inputs the mixed feature amount weighted using the environment sound feature amount to the second acoustic model that is untrained, and acquires a plurality of masks corresponding to each of a plurality of correct answer acoustic signals output from the second acoustic model. For example, the mask estimation part 15 inputs the mixed feature amount weighted using the environment sound feature amount to the second acoustic model that is untrained, and acquires the first mask corresponding to the first correct answer acoustic signal and the second mask corresponding to the second correct answer acoustic signal output from the second acoustic model.

Next, in step S26, the acoustic signal conversion part 16 calculates a plurality of separated feature amounts corresponding to each of a plurality of correct answer acoustic signals from the mixed feature amount converted by the mixed feature amount conversion part 12 by using a plurality of the masks estimated by the mask estimation part 15. At this time, the acoustic signal conversion part 16 calculates a plurality of separated feature amounts corresponding to each of a plurality of correct answer acoustic signals by multiplying the mixed feature amount converted by the mixed feature amount conversion part 12 by each of a plurality of the masks estimated by the mask estimation part 15 in each time frequency component. For example, the acoustic signal conversion part 16 calculates the first separated feature amount corresponding to the first correct answer acoustic signal by multiplying the mixed feature amount converted by the mixed feature amount conversion part 12 and the first mask estimated by the mask estimation part 15 in each time frequency component, and calculates the second separated feature amount corresponding to the second correct answer acoustic signal by multiplying the mixed feature amount converted by the mixed feature amount conversion part 12 and the second mask estimated by the mask estimation part 15 in each time frequency component.

Next, in step S27, the acoustic signal conversion part 16 converts a plurality of the calculated separated feature amounts into a plurality of separated acoustic signals. At this time, the acoustic signal conversion part 16 inputs a plurality of the calculated separated feature amounts to the third acoustic model that is untrained and acquires a plurality of separated acoustic signals output from the third acoustic model. For example, the acoustic signal conversion part 16 inputs the calculated first separated feature amount to the third acoustic model that is untrained and acquires the first separated acoustic signal output from the third acoustic model, and inputs the calculated second separated feature amount to the third acoustic model that is untrained and acquires the second separated acoustic signal output from the third acoustic model.

Next, in step S28, the parameter update part 22 calculates an error between each of a plurality of the separated acoustic signals output from the third acoustic model and each of a plurality of the correct answer acoustic signals acquired by the training acoustic signal acquisition part 21. For example, the parameter update part 22 calculates an error between the first separated acoustic signal output from the third acoustic model and the first correct answer acoustic signal, and calculates an error between the second separated acoustic signal output from the third acoustic model and the second correct answer acoustic signal.

Next, in step S29, the parameter update part 22 calculates an average of a plurality of the calculated errors. For example, the parameter update part 22 calculates an average of an error between the first separated acoustic signal and the first correct answer acoustic signal and an error between the second separated acoustic signal and the second correct answer acoustic signal.

Next, in step S30, the parameter update part 22 updates each parameter of the first acoustic model of the mixed feature amount conversion part 12, the second acoustic model of the mask estimation part 15, the third acoustic model of the acoustic signal conversion part 16, and the fourth acoustic model of the environment sound feature amount conversion part 14 so that an average of a plurality of the calculated errors is minimized.

Note that one piece of training data includes a training mixed acoustic signal and a plurality of correct answer acoustic signals, and the training acoustic signal acquisition part 21 acquires one piece of training data among a plurality of pieces of training data. Then, the processing of steps S21 to S30 is performed for all of a plurality of pieces of training data, and the first acoustic model, the second acoustic model, the third acoustic model, and the fourth acoustic model are trained.

As described above, a training mixed acoustic signal and a plurality of correct answer acoustic signals corresponding to correct answers of a plurality of acoustic signals included in a training mixed acoustic signal are acquired. A training mixed acoustic signal is input to the first acoustic model, and a mixed feature amount is output from the first acoustic model. A correct answer environment acoustic signal indicating an environment sound corresponding to a correct answer among a plurality of correct answer acoustic signals is input to the fourth acoustic model, and an environment sound feature amount is output from the fourth acoustic model. The mixed feature amount output from the first acoustic model is weighted using the environment sound feature amount output from the fourth acoustic model. The weighted mixed feature amount is input to the second acoustic model, and a plurality of masks are output from the second acoustic model. A separated feature amount corresponding to each of a plurality of acoustic signals is calculated from the mixed feature amount using a plurality of the masks output from the second acoustic model. A plurality of the calculated separated feature amounts are input to the third acoustic model, and a plurality of separated acoustic signals are output from the third acoustic model. An error between each of a plurality of the acoustic signals output from the third acoustic model and each of a plurality of correct answer acoustic signals is calculated. Each param- eter of the first acoustic model, the second acoustic model, the third acoustic model, and the fourth acoustic model is updated based on a plurality of the calculated errors.

Therefore, the first acoustic model, the second acoustic model, the third acoustic model, and the fourth acoustic model can be trained using a training mixed acoustic signal and a plurality of correct answer acoustic signals corre- sponding to correct answers of a plurality of acoustic signals included in the training mixed acoustic signal, and estima- tion accuracy of the first acoustic model, the second acoustic model, the third acoustic model, and the fourth acoustic model can be improved.

Note that, in the present embodiment, sound other than an environment sound may be a sound emitted by a specific object. The sound emitted by a specific object may be, for example, a sound of a siren of a police vehicle, a fire engine, an ambulance or the like. The learning device 2 trains the first to fourth acoustic models by using a training mixed acoustic signal in which an acoustic signal indicating a sound of a siren and an acoustic signal indicating an envi- ronment sound other than the sound of the siren are mixed, so that the signal processing device 1 can separate and output the sound of the siren and the environment sound other than the sound of the siren.

Note that, in each of the above embodiments, the case where a plurality of masks are time frequency masks is described, but the present disclosure is not limited to this. For example, a plurality of masks may be vectors indicating degree of contribution to each acoustic signal in each element of a mixed feature amount.

In each of the above embodiments, each constituent element may be implemented by being configured with dedicated hardware or by execution of a software program suitable for each constituent element. Each constituent ele- ment may be implemented by a program execution unit, such as a CPU or a processor, reading and executing a software program recorded in a recording medium such as a hard disk or a semiconductor memory. Further, the program may be carried out by another independent computer system by being recorded in a recording medium and transferred or by being transferred via a network.

Some or all functions of the device according to the embodiment of the present disclosure are implemented as large scale integration (LSI), which is typically an integrated circuit. These may be individually integrated into one chip, or may be integrated into one chip so as to include some or all of them. Further, circuit integration is not limited to LSI, and may be implemented by a dedicated circuit or a general purpose processor. A field programmable gate array (FPGA), which can be programmed after manufacturing of LSI, or a reconfigurable processor in which connection and setting of circuit cells inside LSI can be reconfigured may be used.

Further, some or all functions of the device according to the embodiment of the present disclosure may be imple- mented by a processor such as a CPU executing a program.

Further, all numbers used above are illustrated to specifi- cally describe the present disclosure, and the present dis- closure is not limited to the illustrated numbers.

Further, order in which steps illustrated in the above flowchart are executed is for specifically describing the present disclosure, and may be any order other than the above order as long as a similar effect is obtained. Further, some of the above steps may be executed simultaneously (in parallel) with other steps.

The technique according to the present disclosure is useful as a technique for separating a plurality of acoustic signals from a mixed acoustic signal because complicated preparation processing for creating auxiliary information regarding an acoustic signal of a target sound source in advance is unnecessary, and lowering in performance of separating a plurality of acoustic signals from a mixed acoustic signal can be prevented.

The invention claimed is:

1. A signal processing device comprising:

a mixed acoustic signal acquisition part that acquires a mixed acoustic signal including a plurality of acoustic signals;

a mixed feature amount conversion part that converts the mixed acoustic signal into a mixed feature amount indicating a feature of the mixed acoustic signal;

a mask estimation part that estimates a plurality of masks corresponding to each of the plurality of acoustic signals based on the mixed feature amount;

an acoustic signal conversion part that calculates a plu- rality of separated feature amounts corresponding to each of the plurality of acoustic signals from the mixed feature amount by using the plurality of masks, and converts the plurality of separated feature amounts that are calculated into a plurality of separated acoustic signals;

an environment sound section estimation part that esti- mates an environment sound section including only an acoustic signal indicating an environment sound in all input sections of the mixed acoustic signal based on the plurality of separated acoustic signals;

an environment acoustic signal extraction part that extracts, as an environment acoustic signal, the mixed acoustic signal in the estimated environment sound section from the mixed acoustic signal; and an environment sound feature amount conversion part that converts the environment acoustic signal into an environment sound feature amount indicating a feature of the environment acoustic signal, wherein the mask estimation part weights the mixed feature amount by using the environment sound feature amount, and estimates the plurality of masks based on the weighted mixed feature amount.

2. The signal processing device according to claim 1, wherein the mixed feature amount conversion part includes a first acoustic model that outputs the mixed feature amount when the mixed acoustic signal is input, the mask estimation part includes a second acoustic model that outputs the plurality of masks when the mixed feature amount is input, the acoustic signal conversion part includes a third acoustic model that outputs the plurality of separated acoustic signals when the plurality of separated feature amounts that are calculated are input, and the environment sound feature amount conversion part includes a fourth acoustic model that outputs the environment sound feature amount when the environment acoustic signal is input.

3. The signal processing device according to claim 2, further comprising:

a training acoustic signal acquisition part that acquires a training mixed acoustic signal and a plurality of correct answer acoustic signals corresponding to a correct answer of a plurality of acoustic signals included in the training mixed acoustic signal; and a parameter update part that updates each parameter of the first acoustic model, the second acoustic model, the third acoustic model, and the fourth acoustic model, wherein the mixed feature amount conversion part inputs the training mixed acoustic signal to the first acoustic model and acquires the mixed feature amount output from the first acoustic model, the environment sound feature amount conversion part inputs a correct answer environment acoustic signal indicating an environment sound corresponding to a correct answer among the plurality of correct answer acoustic signals to the fourth acoustic model and acquires the environment sound feature amount output from the fourth acoustic model, the mask estimation part weights the mixed feature amount output from the first acoustic model by using the environment sound feature amount output from the fourth acoustic model, inputs the weighted mixed feature amount to the second acoustic model, and acquires the plurality of masks output from the second acoustic model, the acoustic signal conversion part calculates a plurality of separated feature amounts corresponding to each of the plurality of correct answer acoustic signals from the mixed feature amount by using the plurality of masks output from the second acoustic model, inputs the plurality of separated feature amounts that are calculated to the third acoustic model, and acquires the plurality of separated acoustic signals output from the third acoustic model, and the parameter update part calculates an error between each of the plurality of acoustic signals output from the third acoustic model and each of the plurality of correct answer acoustic signals, and updates each parameter of the first acoustic model, the second acoustic model, the third acoustic model, and the fourth acoustic model based on a plurality of calculated errors.

4. The signal processing device according to claim 1, wherein the plurality of acoustic signals includes an acoustic signal indicating the environment sound and an acoustic signal indicating sound other than the environment sound.

5. The signal processing device according to claim 4, wherein the sound other than the environment sound is voice uttered by a person.

6. The signal processing device according to claim 4, wherein the sound other than the environment sound is a sound emitted by a specific object.

7. The signal processing device according to claim 1, wherein the environment acoustic signal extraction part stores the extracted environment acoustic signal in a memory, and the environment sound feature amount conversion part reads the environment acoustic signal from the memory and converts the read environment acoustic signal into an environment sound feature amount.

8. The signal processing device according to claim 1, further comprising an acoustic signal output part that outputs the plurality of separated acoustic signals converted by the acoustic signal conversion part.

9. A signal processing method, by a computer, comprising:

acquiring a mixed acoustic signal including a plurality of acoustic signals;

converting the mixed acoustic signal into a mixed feature amount indicating a feature of the mixed acoustic signal;

estimating a plurality of masks corresponding to each of the plurality of acoustic signals based on the mixed feature amount;

calculating a plurality of separated feature amounts corresponding to each of the plurality of acoustic signals from the mixed feature amount by using the plurality of masks, and converting the plurality of separated feature amounts that are calculated into a plurality of separated acoustic signals;

estimating an environment sound section including only an acoustic signal indicating an environment sound in all input sections of the mixed acoustic signal based on the plurality of separated acoustic signals;

extracting, as an environment acoustic signal, the mixed acoustic signal in the estimated environment sound section from the mixed acoustic signal; and converting the environment acoustic signal into an environment sound feature amount indicating a feature of the environment acoustic signal, and in estimation of the plurality of masks, the mixed feature amount is weighted using the environment sound feature amount, and the plurality of masks are estimated based on the weighted mixed feature amount.

10. A non-transitory computer readable recording medium storing a signal processing program that causes a computer to function as:

a mixed acoustic signal acquisition part that acquires a mixed acoustic signal including a plurality of acoustic signals;

a mixed feature amount conversion part that converts the mixed acoustic signal into a mixed feature amount indicating a feature of the mixed acoustic signal;

a mask estimation part that estimates a plurality of masks corresponding to each of the plurality of acoustic signals based on the mixed feature amount;

an acoustic signal conversion part that calculates a plurality of separated feature amounts corresponding to each of the plurality of acoustic signals from the mixed feature amount by using the plurality of masks, and converts the plurality of separated feature amounts that are calculated into a plurality of separated acoustic signals;

an environment sound section estimation part that estimates an environment sound section including only an acoustic signal indicating an environment sound in all input sections of the mixed acoustic signal based on the plurality of separated acoustic signals;

an environment acoustic signal extraction part that extracts, as an environment acoustic signal, the mixed acoustic signal in the estimated environment sound section from the mixed acoustic signal; and an environment sound feature amount conversion part that converts the environment acoustic signal into an environment sound feature amount indicating a feature of the environment acoustic signal, and the mask estimation part weights the mixed feature amount by using the environment sound feature amount, and estimates the plurality of masks based on the weighted mixed feature amount.

\* \* \* \* \*